United States Patent Office 3,130,038
Patented Apr. 21, 1964

3,130,038
GRANULAR FERTILIZERS
Royle P. Thomas, Evanston, James C. Engibous, Mount Prospect, and Francis T. Nielsson, Morton Grove, Ill., assignors to International Minerals & Chemical Corporation, a corporation of New York
No Drawing. Filed Mar. 13, 1961, Ser. No. 94,969
13 Claims. (Cl. 71—29)

This invention generally relates to granular fertilizers. More particularly the invention relates to a novel granular fertilizer composition and to a novel process for the manufacture of granular fertilizers containing plant nutrients which are gradually released to the soil during the growing period of the plant.

One of the disadvantages inherent in many nitrogen-phosphorus-potash fertilizers sold commercially heretofore is that a substantial portion of the plant nutrients in these fertilizers, particularly nitrogen, is solubilized in the soil at a rate greater than that which the plants can utilize these nutrients. As a result, it is frequently necessary to make several applications of fertilizer to the soil during the growing period in order to obtain optimum growth of the plant. Further, this type of fertilizer is often inefficient because a substantial portion of the plant nutrients may be washed away from the plant before they can be utilized.

In more recent times a urea-formaldehyde resin material has been used as a fertilizer material to provide nitrogen to the crop. The nitrogen present in the urea-formaldehyde resin is relatively insoluble in cold water, however, the nitrogen is available to the plant at a relatively slow rate when applied to soils. As a result, the urea-formaldehyde resin may be used to supply nitrogen to the plant over a substantial portion of the growing period.

It is also well known that plant growth is influenced to a considerable degree by the availability of one or more so-called minor elements, such of zinc, manganese, copper, iron and the like. However, excessive quantities of available minor elements are toxic to plants and, therefore, when water soluble compounds of these minor elements are applied to the soil the quantity of these compounds that is solubilized in the soil usually exceeds the plant requirements and may be detrimental to plant growth. On the other hand, when insoluble minor element compounds are added to the soil, they are not readily available to the plant and in certain instances may become even less soluble in the soil fluids.

It is an object of the present invention to overcome disadvantages inherent in previously known complete fertilizers.

It is another object to provide a novel granular fertilizer composition and a novel process for the manufacture of granular fertilizers containing plant nutrients in varying degrees of solubility in order to provide plant nutrients to the plant over a substantial portion of the growing period.

A further object is to provide a novel granular fertilizer composition and a novel process for the manufacture of granular fertilizers containing insoluble compounds of minor elements and a chelating agent to render the insoluble minor element compounds slowly available to the plants.

These and other objects and advantages of the invention will become apparent from the description of the invention.

In general, the present invention is a complete granular fertilizer comprising at least two phosphate compounds one of which has a relatively higher rate of solubility in water than the other, at least two potassium compounds one of which has a relatively higher rate of solubility in water than the other, at least two magnesium compounds one of which has a relatively higher rate of solubility in water than the other, relatively water insoluble compounds of at least two minor elements selected from the group consisting of copper, manganese, zinc, iron, titanium, boron, strontium, lead, molybdenum, nickel, vanadium, cobalt, and chromium, a chelating agent capable of forming metal complexes at a pH between about 3 and about 9 with said minor element compounds, a condensed partially polymerized urea-formaldehyde resin having a urea to formaldehyde molar ratio between about 1.2:1 and about 2:1, and a water soluble nitrogen compound selected from the group consisting of ammonium salts and urea, a major portion of the nitrogen content of said fertilizer being in the form of said urea-formaldehyde resin.

The present invention is also directed to a continuous process for the preparation of a complete granular fertilizer which comprises the steps of mixing solid condensed partially polymerized urea-formaldehyde resin having a urea to formaldehyde molar ratio of between about 1.2:1 and about 2:1, water insoluble compounds of at least two of the minor elements required in plant nutrition, a chelating agent capable of forming metal complexes at a pH between about 3 and about 9, superphosphate, at least two potassium compounds one of which is more soluble in water than the other, at least two magnesium compounds one of which is more soluble in water than the other, and sulfuric acid to partially granulate the solids, conveying said partially granulated solids to a rotating granulator, contacting said partially granulated solids with sulfuric acid and a water soluble nitrogen compound selected from the group consisting of ammonium salts and urea, the total nitrogen content added as said water soluble nitrogen content being less than the nitrogen content provided by said polymerized urea-formaldehyde resin, whereby solid ammonium sulfate and ammonium phosphate are formed in situ, continuously removing a portion of the granular solids from the rotating granulator, heating said granulated solids to dryness, separating oversized granules having a particle size larger than about 10 mesh and fine particles passing through a screen of about 14 mesh from the granular product, crushing the oversized particles, recycling the crushed oversized particles to said separation step, and recycling fine particles to the solids mixing step.

Components of the novel fertilizer of the present invention include compounds of potassium, phosphorus, magnesium, calcium, nitrogen and minor elements.

Solid materials which may be used in the preparation of the novel fertilizer include, inter alia, urea-formaldehyde resin, relatively water insoluble compounds of minor elements, superphosphate, potassium chloride, potassium sulfate, double sulfate of potash and magnesium, urea, hydrated lime, and dolomite. Urea-formaldehyde resin used in the preparation of the novel fertilizer has a urea to formaldehyde molar ratio of between about 1.2:1 and about 2:1, and a nitrogen activity index of between about 40% and about 60%. The nitrogen activity index of the resin is determined in accordance with the procedure of H. A. Davis, Journal of The Association of Official Agricultural Chemists, vol. 38, p. 436, 1955. Urea-formaldehyde resins may be prepared in accordance with the procedures of K. G. Clark et al., as presented in Industrial and Engineering Chemistry, vol. 40, pp.1178–1183, 1948, in Industrial and Engineering Chemistry, vol. 43, pp. 871–875, 1951, and in Agricultural and Food Chemistry, vol. 4, pp. 135–140, 1956. Urea-formaldehyde resins prepared by these procedures are substantially fully condensed but only partially polymerized. Further polymerization is undesirable, since the availability of nitrogen in the resin decreases with increased polymerization. In the preparation of the novel fertilizer further polymerization of the resin is prevented by careful control of the temperature and pH during processing. It is undesirable to use a resin having a urea to formaldehyde molar ratio of less than about 1.2:1, since a substantial amount of the resin is totally insoluble in the soil. When the molar ratio is greater than about 2:1, there is an excessive amount of water soluble nitrogen in the resin. A urea-formaldehyde resin having a urea to formaldehyde molar ratio between about 1.2:1 and about 2:1 has the characteristic of being substantially insoluble in cold water but slowly available to the plant when contacted with soil fluids. Sufficient urea-formaldehyde resin is used in the preparation of the novel fertilizer to provide between about 55 and about 80% and preferably about 70% of the total nitrogen in the fertilizer.

Liquid substances used in the preparation of the novel fertilizer include sulfuric acid and aqueous solutions of ammonia, ammonium nitrate, and urea as well as aqueous solutions of unpolymerized urea and formaldehyde. An aqueous solution of sulfuric acid having a concentration between about 70% and about 94% $H_2SO_4$ by weight is preferably used. Less concentrated sulfuric acid solutions are undesirable because they cause excessive corrosion of iron pipes and the like, and, therefore, more expensive materials of construction must be used. Acids having a concentration in excess of about 94% $H_2SO_4$ by weight are generally undesirable since excessive heats of reaction may be generated during granulation, which may result in fires in the granulator.

Various amounts of the above-mentioned solid and liquid components are used in the preparation of the novel fertilizer. The quantities of these materials depend upon the grade of fertilizer that is desired. For example, fertilizers having a N-$P_2O_5$-$K_2O$ weight ratio of 2-1-1 may be prepared for use as a fertilizer for pastures and flowers. Typical grades having this weight ratio are 14-7-7 and 12-6-6. Other fertilizers having a N-$P_2O_5$-$K_2O$ weight ratio of 3-2-1, 3-2-2, 1-1-1, 1-2-2, and the like may also be prepared.

Nitrogen compounds used in the fertilizer composition of this invention include ammonium salts, urea, and fully condensed, partially polymerized urea-formaldehyde resin having a urea to formaldehyde mole ratio of between 1.2:1 and about 2:1. The nitrogen in the urea-formaldehyde resin is soluble in water at a rate substantially lower than that at which urea and ammonium salts are soluble in water.

As pointed out above, a substantial portion of the nitrogen in the novel fertilizer should be in the form of urea-formaldehyde. In order that nitrogen will be available to the plant during the entire growing period, the remainder of the nitrogen in the novel fertilizer should be in the form of compounds which are more soluble, that is soluble at a higher rate, in water than the urea-formaldehyde resin. This is accomplished by including nitrogen compounds in the novel fertilizer in the form of ammonium salts and urea. Sufficient ammonia is added to the solid fertilizer ingredients to react with acidic components such as phosphoric acid and sulfuric acid to form ammonium phosphate and ammonium sulfate, respectively, so that each is present in an amount equivalent to between about 5% and about 15% and preferably between about 8 and 12% of the total nitrogen. Preferably, sufficient ammonium nitrate is used in the preparation of the novel fertilizer to provide between about 5% and about 15%, and more preferably between about 8% and 12% of the total nitrogen. Sufficient urea is added in the preparation of the novel fertilizer to preferably provide between about 5% and about 15%, and more preferably between about 8% and 12% of the total nitrogen in the form of urea.

It is preferred to add an aqueous solution of ammonia, ammonium nitrate, and urea of the type which is presently available commercially for the preparation of fertilizers. A typical solution contains about 28% free ammonia, about 40% ammonium nitrate, about 15% urea and about 17% water by weight. Other solutions having the same components in different amounts are also available and may be used in the preparation of the novel fertilizer. If desired, ammonia may be added in the form of anhydrous ammonia and the ammonium nitrate and the urea components may be added separately as aqueous solutions. Ammonium nitrate and urea may also be added in solid form, but in this instance water should be added to the solids mixture in a sufficient amount to accomplish granulation of the solid fertilizer particles.

Minor element compounds in the fertilizer include water insoluble compounds or ores containing water insoluble compounds of the minor elements. The fertilizer also contains a chelating agent in order to render the slowly soluble minor element compounds more available for plant utilization.

Compounds of minor elements are pre-mixed preferably in the desired amounts to form a minor element mixture prior to mixing with the other components of the novel fertilizer. Water insoluble compounds of the minor elements such as the oxide and sulfate, or ores containing these compounds are finely ground in a suitable comminuting apparatus such as a ball mill, and blended with a chelating agent in a suitable mechanism such as a pug mill to obtain a substantially homogenous material. It is a specifically preferred feature that at least 90% and preferably about 95% of the particles in the minor element mix be less than about 325 mesh. It has been determined that when the minor element compound is in such a small particle size, when mixed with a chelating agent, the minor element is available to the plant at a suitable rate. Water insoluble compounds of minor elements used in the preparation of the minor element mix include compounds of copper, manganese, zinc, iron, titanium, boron, barium, strontium, lead, molybdenum, nickel, vanadium and cobalt.

Various substantially water insoluble compounds of any of the minor elements may be used in the preparation of the minor element mix of which the following merely illustrates a convenient and generally readily available form. Copper oxide may be added in the form of fine particles recovered as waste material in the ammonia leach process of solubilizing copper ores. Manganese may be added in the form of finely divided pyrolusite. Zinc may be supplied as a zinc oxide obtained by calcining sphalerite ore. Iron and titanium components may be added in the form of ilmenite which is obtained by the beneficiation of the Florida beach sands. Iron may be added also as finely divided ferric oxide waste material recovered from the dust collectors in the beneficiation of hematite ores. Boron may be added as a fritted boron, a synthetic boron silicate presently sold commercially under the trademark Safte-Bor-E. Barium may be added in the form of barium sulfate. Strontium may be supplied in the form of celestite ore and lead may be added as a galena ore. Molybdenum, nickel and vanadium may be added as the oxides. Cobalt may be supplied from a filter cake obtained in the processing of cobalt ores. Chemical analysis of the filter cake is as follows:

| Element: | Percent by weight |
| --- | --- |
| Cobalt | 10.7 |
| Nickel | 7.0 |
| Molybdenum | 0.75 |
| Chromium | 17.8 |
| Iron | 3.8 |

Elements are presented in this material as oxides and/or hydroxides. Glauconite may also be added to the minor element mixture in order to provide a source of potash, iron and other minor elements.

The composition of the minor element mixture may be varied within desired limits but preferably contains between about 35 and about 45% minor elements by weight. A typical analysis of a suitable minor element mixture is given in Table I.

TABLE I

| Component: | Percent by weight |
|---|---|
| Copper | 3.0 |
| Manganese | 8.8 |
| Zinc | 6.0 |
| Iron | 13.5 |
| Titanium | 0.83 |
| Boron | 1.3 |
| Barium | 3.0 |
| Strontium | 1.5 |
| Lead | 0.92 |
| Molybdenum | 0.23 |
| Nickel | 0.18 |
| Vanadium | 0.08 |
| Cobalt | 0.06 |
| Chelating agent | 1.0 |

In order that the insoluble minor element compounds may be rendered slowly available to the plants when applied to the soil preferably at least 90% of the minor element compounds are of —325 mesh size and a chelating agent is added to the minor element mix in an amount between about 0.5 and about 4.0%, and preferably between about 0.9 and about 4.0% and more preferably between about 1 and 2% by weight. The chelating agent may be any suitable agent having the characteristic of forming metal complexes at a pH between about 3 and about 9, in order that the minor element compounds will chelate so that the minor element may be solubilized in a variety of soils. Some soils are alkaline, some are acidic and some are neutral. By selecting the preferred chelating agent, chelation with the minor element compound will occur. Suitable chelating agents include ethylenediaminetetracetic acid, sodium salts of ethylenediaminetetracetic acid, N-hydroxyethylethylenediaminetriacetic acid, trimethylenediaminetetracetic acid, diethylenetriaminepentaacetic acid (sold commercially under the trademark Agri-Chel), and the like. Chelating agents derived from natural sources are also suitable. Such natural chelating agents may be derived from wood products. A specific chelating agent of this type is sold by Rayonier Incorporated under the trademark HT-145.

The amount of the minor element mix used in the preparation of the fertilizer depends upon the type of plant and the type of soil. The minor element mixture of the above-mentioned analysis is preferably used in an amount between about 30 and about 110 pounds and more preferably between about 85 and 100 pounds of minor element mix per ton of fertilizer. Greater or lesser quantities of the minor element mix may be used, depending upon the plant and soil requirements.

It has been discovered that fertilizers containing insoluble compounds of the minor elements in conjunction with a suitable chelating agent give substantially improved results over the use of a chelating agent in conjunction with soils which already contain certain compounds of minor elements. For example, in the area adjacent to the Mesabi range in Minnesota the soil is relatively high in the insoluble iron compounds. Addition of a chelating agent to a soil of this type at a rate of about 100 pounds per acre had little effect upon solubilizing or chelating the iron compounds of the soil and, therefore, had little effect upon plant growth. However, addition of a fertilizer containing a mixture prepared as described above comprising a minor element mixture and a chelating agent resulted in a substantial improvement in the growth of the plants.

The fertilizer composition of the present invention contains at least two phosphate compounds one of which has a relatively higher rate of solubility in water than the other. It preferably also contains at least two calcium compounds one of which has a relatively higher rate of solubility in water than the other. The phosphate and calcium components of the fertilizer are preferably supplied as a superphosphate which has been prepared by the reaction of phosphate rock and sulfuric acid. Superphosphate prepared in this manner usually has a $P_2O_5$ content on the order of between about 18 and 20%, but it may be between about 14 and about 25% by weight. The calcium oxide content of this material is between about 26 and about 31% by weight. If desired, triple superphosphate having a $P_2O_5$ content of about 46% by weight may also be used. This material is prepared by the reaction of phosphate rock and phosphoric acid. The calcium and phosphorus in superphosphate and triple superphosphate are present predominantly as water soluble monocalcium phosphate, however, they generally also contain some dicalcium phosphate and tricalcium phosphate which compounds are soluble in water at a slower rate than monocalcium phosphate.

In general, it is preferred that at least 5% of the $P_2O_5$ and calcium values in the fertilizer mixture be present as compounds soluble in water at a slower rate than monocalcium phosphate. The phosphate is also present in the fertilizer composition as ammonium phosphate which is formed in situ. The ammonium phosphate is, of course, relatively rapidly soluble in water. Calcium may also be present in the fertilizer mixture as dolomite, calcium-magnesium carbonate. The calcium in dolomite is soluble in water at a rate substantially lower than the calcium in monocalcium phosphate.

The fertilizer composition of the present invention also contains at least two potassium compounds one of which has a relatively higher rate of solubility in water than the other. Potassium sulfate and potassium chloride are relatively rapidly water soluble materials and the more soluble potassium compound is preferably selected from these materials. Fertilizer grade potassium sulfate and potassium chloride are readily available. A fertilizer grade of potassium chloride having a $K_2O$ content of between about 50 and about 62% by weight is preferably used. A fertilizer grade of potassium sulfate having a $K_2O$ content of between about 40% and about 54% by weight is preferably used. A double sulfate of potassium and magnesium, such as langbeinite having the chemical formula $K_2SO_4 \cdot 2MgSO_4$, is soluble in water at a relatively slower rate than potassium, sulfate and/or potassium chloride. The rate of solubility of langbeinite is particularly lower when the langbeinite is in the form of granules which is the preferred physical form of langbeinite for use in fertilizer compositions. In general, it is preferred that between about 10% and about 50% of the $K_2O$ content of the fertilizer composition be supplied as langbeinite. Accordingly, the fertilizer composition of the present invention preferably contains langbeinite in an amount sufficient to provide between about 10% and about 50% of the $K_2O$ content of the final fertilizer composition and the remaining $K_2O$ content is supplied by potassium sulfate or potassium chloride or mixtures thereof.

The fertilizer composition of the present invention also contains at least two magnesium compounds one of which has a relatively higher rate of solubility in water than the other. The more readily water soluble magnesium compound is preferably supplied as a double sulfate of potash and magnesium such as langbeinite and the less readily water soluble magnesium compound is preferably supplied as dolomite. A typical chemical analysis of langbeinite is as follows:

| Components: | Percent by weight |
|---|---|
| $K_2O$ | 22.5 |
| $MgO$ | 18.6 |
| $SO_4$ | 67.2 |

A typical chemical analysis of dolomite is 30.4% CaO and 24.9% MgO by weight.

It is preferred that between about 10% and about 90% by weight of the MgO content of the final fertilizer composition be supplied as langbeinite.

It is necessary that all of the solid components used in preparation of the novel fertilizer have a particle size less than about 6 mesh, and preferably less than about 14 mesh in order to obtain optimum distribution of the various components throughout the novel fertilizer.

By providing two phosphate compounds of different water solubilities, one will be dissolved in the water in the soil to which the fertilizer is applied at a faster rate than the other, thereby furnishing phosphate nutrient to the soil over an extended period of time. The same is true of the potassium nutrient which is supplied as at least two potassium compounds, one of which is soluble in water at a faster rate than the other. The same also holds for the magnesium nutrient and the nitrogen nutrient, each of which is present in the fertilizer composition as at least two compounds, one of which is soluble in the water in the soil at a faster rate than the other. Accordingly, the fertilizer composition of the present invention provides each of the plant nutrients as two different compounds so that each nutrient will be provided to the plant over an extended period of time.

The chelating agent is present in the fertilizer composition in order that the insoluble minor element compounds may be rendered slowly available to the growing plants when applied to the soil. The danger of releasing toxic amounts of minor elements is thereby virtually eliminated.

The fertilizer composition of the present invention does not merely provide a mixture in which each component of the mixture produces its expected effect, but, it has been determined that a synergistic effect occurs when combining the fertilizer ingredients so as to achieve the composition of the present invention. Furthermore, it has been determined that the fertilizer composition of the present invention is far superior to fertilizers known heretofore with respect to yield of protein in the plant and other response criteria.

As hereinabove set forth it has been determined that when the novel fertilizer containing a mixture of a chelating agent and relatively water insoluble minor element compounds is applied to the soil, the minor elements are released to the plant at a relatively uniform rate during the entire growing season, and at a rate which is not toxic to the plants. In contrast to this, chelating agents complexed with minor elements, as taught by the prior art, are readily soluble in soil fluids. Complexes of the prior art type may release the minor elements to the plant at a toxic rate, unless applied to the soil in small doses, or the complex may be solubilized during a heavy rain fall and washed away from the plant roots. As a result the complex of the prior art must be applied in small doses and frequent applications must be made during the growing season. On the other hand, the fertilizer composition of the present invention containing a mixture of substantially water insoluble minor element compounds and chelating agents can be applied to the soil without the danger of adding a toxic amount of minor elements, and without the need for making several applications during the growing season.

In the preparation of the novel fertilizer, solid ingredients are pre-mixed in the desired amounts in the presence of sulfuric acid. Partially granulated solids are introduced into a rotating granulator and contacted with additional sulfuric acid, ammonia, ammonium nitrate, and urea. After granulation of the solids is accomplished, the granules are dried and screened to recover a product of the desired particle size. Oversize particles are crushed and returned to the screens while fine particles are recycled to the initial solids mixing step.

The novel fertilizer is prepared by mixing urea-formaldehyde resin, superphosphate, potassium compounds, dolomite, a mixture of water insoluble compounds of minor elements and a chelating agent, and about one-half of the total sulfuric acid requirement in a suitable container such as a pug mill. Fine particles from a subsequent screening step in the process are also introduced to the pug mill. Partially granulated solids from the pug mill are introduced to a suitable rotating granulator. A suitable granulator is described in U.S. Patent No. 2,741,545 but other types of rotating granulators may be used. The remainder of the sulfuric acid requirement and an aqueous solution of ammonia, ammonium nitrate and urea are introduced simultaneously below the bed of tumbling solids. A portion of the solids in the granulator is continuously removed and conveyed to a suitable drying apparatus such as a rotating dryer. The average temperature of the solids in the dryer should be maintained between about 130° and about 160° F. At temperatures above about 160° F. there is an increase in the degree of polymerization of urea-formaldehyde resin and a decrease in the availability of nitrogen in this compound. At temperatures below about 130° F., a prolonged drying period may be necessary.

A portion of the solids in the dryer is continuously removed and conveyed to a separating means such as a shaking screen. Dryer product is separated by screening into a coarse or oversize fraction having a particle size of about +6 mesh, a middling or product fraction having a particle size of about −6 +40 mesh, and a fine fraction having a particle size about −40 mesh. The middling fraction from the size separation comprises the novel complete granular fertilizer. Particle size of the granular fertilizer or middling fraction may be controlled by the use of suitable screens having the desired mesh sizes. Oversize particles from the screening step are crushed in a suitable impacting mechanism and recycled to the screens. The fine fraction from the screens is recycled to the pug mill. The middling fraction from the screen may be cooled in a suitable apparatus such as a rotating cooler and conveyed to storage.

The utility of the invention is illustrated by the following examples without any intention that the invention be limited thereto. All parts and percentages are by weight unless otherwise specified.

*Example I*

About 2,000 parts of a complete granular fertilizer having a N-$P_2O_5$-$K_2O$ analysis of about 14–7–7 percent, respectively, was prepared in the following manner.

About 1,000 parts of recycle product of a particle size less than about 14 mesh obtained as hereinafter described was mixed with ingredients as follows:

About 720 parts of superphosphate having a $P_2O_5$ content of about 20%, about 460 parts of urea-formaldehyde resin having a urea to formaldehyde mole ratio of about 1.3, about 116 parts of potassium chloride having a $K_2O$ analysis of about 60%, about 326 parts of langbeinite, about 100 parts of a mixture of water insoluble compounds of minor elements having the composition shown in Table I and in which the chelating agent is diethylenetriaminepentaacetic acid, about 20 parts of dolomite, and about 55 parts of 66° Bé. sulfuric acid were mixed in a pug mill.

A portion of the partially granulated solids was continuously removed from the pug mill and conveyed to a rotating granulator having a diameter of about 3 feet and a length of about 3 feet. An aqueous solution containing about 28% free ammonia, about 40% ammonium nitrate, about 15% urea, and about 17% water was conveyed from storage and introduced below the surface of the bed of tumbling solids in the granulator by means of a nitrogen solution distributor. This distributor was comprised of a pipe of about ½" diameter, having a length of about 1½ feet. Twelve holes having a ⅟₁₆" diameter were spaced about 1½" apart in a straight line along the length of the distributor on the upstream side with respect to the direction of rotation of the granulator. The distributor was positioned parallel to the central axis of the granulator about 2½″ from the shell of the granulator, and on the upstream side of the granulator at an angle of about 30° from a vertical plane through the central axis of the granulator. About 247 parts of the above described aqueous nitrogen containing solution per approximately 2700 parts of solids was continuously introduced to the granulator.

A 66° Bé. sulfuric acid solution was conveyed from storage to an acid distributor positioned beneath the surface of the bed of tumbling solids in the granulator. The acid distributor was comprised of a pipe having a diameter of about ½″ and a length of about 1½ feet. The acid distributor was positioned next to and below the nitrogen solution distributor. Six holes having a diameter of about 1/16″ were spaced about 2½″ apart in a straight line along the length of the acid distributor. The center of the holes were positioned in a plane through a radius of the granulator, on the side of the acid distributor nearest the granulator shell. About 55 parts of sulfuric acid were continuously introduced to the granulator simultaneously with the introduction of the 247 parts of nitrogen solution.

Solids were continuously discharged from the granulator at the rate of about 1,000 parts per hour. Solids from the granulator were conveyed to an oil fired rotating dryer having a diameter of about 3 feet and a length of about 25 feet. Combustion gases entered the dryer at a temperature of about 600° F. and were discharged at a temperature of about 140° F. Solids were fed to the dryers at a temperature of about 140° F. and were discharged at a temperature of about 160° F.

Dryer product was conveyed to a double deck shaking screen provided with a 10 mesh screen and a 14 mesh screen. Oversize particles from the screens were crushed and recycled to the screens. The fine fraction from the screens was recycled to the pug mill. About one-half of the dryer product was continuously recovered as the middling or product fraction, having a particle size between about −10 and +14 mesh.

*Example II*

About 2,000 parts of a complete granular fertilizer having a N-$P_2O_5$-$K_2O$ analysis of about 12-8-4 percent, respectively, was prepared in the apparatus and by the procedure of Example I.

About 820 parts of superphosphate having a $P_2O_5$ content of about 20%, about 400 parts of a urea-formaldehyde resin having a urea to formaldehyde mole ratio of about 1.3, about 66 parts of KCl having a $K_2O$ analysis of about 60%, about 187 parts of langbeinite, about 100 parts of a mixture of water insoluble compounds of minor elements and a chelating agent having the composition shown in Table I and in which the chelating agent is diethylenetriaminepentaacetic acid, and about 212 parts of dolomite were mixed in a pug mill. To the solids in the pug mill was added about 50 parts of 66° Bé. sulfuric acid. The partially wetted solids were transferred to the granulator and about 50 parts of 66° Bé. sulfuric acid and about 205 parts of an aqueous solution of ammonia, ammonium nitrate and urea were introduced. The composition of the aqueous nitrogen containing solution was as follows:

| Component: | Percent by weight |
|---|---|
| Ammonia | 28 |
| Ammonium nitrate | 40 |
| Urea | 15 |
| Water | 17 |

About one-half of the dryer product was continuously recovered as the middling or product fraction, having a particle size between about −10 and +14 mesh.

*Example III*

Four fertilizer compositions were prepared, designated as Formulas 1, 2, 3 and 4, each formula having a nitrogen:$P_2O_5$:$K_2O$ weight ratio of about 12:6:6. Formula 1 contained all of the nitrogen in the form of water-soluble compounds and it contained a chelating agent and water insoluble compounds of minor elements. Formula 2 represented a composition containing all of the nitrogen in the form of water-soluble compounds, but contained no chelating agent or minor element compounds. Formula 3, which represents a fertilizer composition in accordance with the present invention contained a chelating agent, minor element compounds, and 70% of the total nitrogen in the form of a urea-formaldehyde resin having a urea to formaldehyde molar ratio of about 1.3:1. Formula 4 represented a composition which contained no minor element compounds or chelating agent, and contained 70% of the total nitrogen in the form of a urea-formaldehyde resin having a urea to formaldehyde molar ratio of about 1.3:1. The specific ingredients and the proportions thereof used to prepare the several formulas were as follows:

| Component | Parts by Weight | | | |
|---|---|---|---|---|
| | Formula 1 | Formula 2 | Formula 3 | Formula 4 |
| Nitrana 6 (Note (a), below) | 175 | 175 | | 175 |
| Nitrana 7 (Note (b)) | | | 173 | |
| Uramite (Note (c)) | | | 440 | |
| Superphosphate (20% $P_2O_5$) | 610 | 610 | 610 | 610 |
| Muriate of Potash (60% $K_2O$) | 130 | 130 | 130 | 130 |
| Langbeinite (22% $K_2O$, 19% MgO) | 200 | 200 | 200 | 200 |
| Minor Element Compounds + Chelating Agent (Note (d)) | 100 | | 100 | |
| Dolomite | 272 | 372 | 272 | 372 |
| Doloxide | 20 | 20 | | 30 |
| Hydrated Lime | | | 20 | |
| Iron Oxide | 30 | 30 | 30 | 30 |
| Sulfuric Acid, 60° Bé | 75 | 75 | | 75 |
| Sulfuric Acid, 66° Bé | | | 75 | |
| Ammonium Nitrate | 360 | 360 | | |
| Urea | 80 | 80 | | |
| Fertilizer Analysis: | | | | |
| Moisture | 3.26 | 3.14 | | 2.70 |
| Nitrogen | 11.55 | 11.45 | 12 | 12.3 |
| $P_2O_5$ | 6.23 | 6.23 | 6 | 6.22 |
| Available $P_2O_5$ | 6.09 | 6.01 | | 5.96 |
| $K_2O$ | 6.23 | 6.33 | 6 | 5.93 |

Note (a).—An ammonium nitrate solution sold commercially by the Allied Chemical and Dye Corporation, containing 49% total nitrogen, 60% ammonium nitrate, 34% anhydrous ammonia and 6% water.

Note (b).—An ammonium nitrate solution sold commercially by the Allied Chemical and Dye Corporation, containing 45% total nitrogen, 69.2% ammonium nitrate, 25.3% anhydrous ammonia and 5.5% water.

Note (c).—A urea-formaldehyde resin sold commercially by the E. I. du Pont De Nemours and Co., Inc., containing 38% nitrogen, having a urea to formaldehyde molar ratio of 1.3:1.

Note (d).—A mixture of finely divided solids, 95% of which pass through a 325 mesh screen, containing water-insoluble compounds of copper, manganese, zinc, iron, titanium, boron, braium, strontium, lead, molybdenum, nickel, vanadium, and colbalt, and containing 1% of diethylenetriaminepentaacetic acid (a chelating agent sold commercially under the trade name Agri-Chel).

Fifteen wooden seed flats (17″ x 17″ x 3″) were each filled with a screened, well-mixed soil, and then divided into five groups of three flats each, designated as groups 1 to 5. Groups 1 to 4 were treated with Formulas 1 to 4 respectively, in a proportion equivalent to 40 pounds of fertilizer per 1,000 square feet. Group 5 was used as a control and no fertilizer was added to the soil. Each flat was sprigged with stolons of St. Augustine grass, using 6″ centers, two stolons per center, at right angles to each other. The flats were placed on the ground in the central Florida area in March and exposed to atmospheric conditions for six months. Observations of the color, density, lateral extension and height were made at intervals during this period.

The grass in each group was harvested in July and again in September. The yield of dry matter and protein were then determined. Summarized in the table is the average protein yield of the two harvests for each treatment.

| Treatment: | Yield of protein, lbs. per acre |
|---|---|
| 1 | 568 |
| 2 | 517 |
| 3 | 1042 |
| 4 | 653 |
| 5 | 215 |

These data show clearly that the protein yield obtained by using the novel fertilizer composition of this invention (treatment 3) was far superior to that obtained by using the other 3 prior art type fertilizers (treatments 1, 2 and 4) or the control (treatment 5).

The data presented in this table also clearly demonstrates the synergistic effect of combining a chelating agent, minor element compounds, and urea-formaldehyde resin with other fertilizer ingredients in accordance with the present invention. For example, the only difference between Formula 1 and Formula 2 is that Formula 2 contained a chelating agent and minor element compounds. Thus the difference between the results obtained using Formula 1 and the results obtained using Formula 2, demonstrates the effect of minor element compounds and a chelating agent upon the plant. Similarly, the only difference between Formula 2 and Formula 4 is that Formula 4 contained 70% of the nitrogen in the form of a urea-formaldehyde resin. Thus the difference between the results obtained with Formula 2 and the results obtained with Formula 4 demonstrates the effect of employing a urea-formaldehyde resin to provide a major portion of the nitrogen in the fertilizer. Theoretically, the difference between Formula 2 and Formula 3 (a composition of the present invention) should equal the sum of the differences of the results between Formulas 1 and 2 and Formulas 2 and 4. An analysis of the table, however, shows that the difference between Formula 2 and Formula 3 is far superior to the sum of the differences between Formulas 1 and 2 and Formulas 2 and 4. The increase in yield due to minor element compounds and chelating agent is the difference between 517 and 568, or 51. The increase due to the use of urea-formaldehyde resin is the difference between 653 and 517, or 136. The sum of these differences is 187 pounds per acre of protein. Theoretically, the difference between Formulas 2 and 3 should equal 187. Actually, however, the difference is 1042 less 517, or 525 pounds per acre, almost 3 times the expected increase in yield of protein.

A similar analysis of other fertilizer response criteria, such as color, height, density, lateral extension, and yield of dry matter, showed that the increase effected by the use of the novel fertilizer composition of the invention was superior or equal to the theoretical increase in each instance.

Example III, therefore, clearly demonstrates that combining minor element compounds, a chelating agent and urea-formaldehyde resin with other fertilizer ingredients, in accordance with the present invention, has a synergistic effect upon plant growth and is far superior to results obtained when these ingredients are added separately to the plants.

The description of the invention utilized specific reference to certain process details; however, it is to be understood that such details are illustrative only and not by way of limitation. Other modifications and equivalents of the invention will be apparent to those skilled in the art from the foregoing description.

Having now fully described and illustrated the invention, what is desired to be secured and claimed by Letters Patent is set forth in the appended claims.

We claim:

1. A continuous process for the preparation of a complete granular fertilizer having controlled release properties for each of its N, P, K and Mg fertilizer ingredients which comprises the steps of mixing solid condensed partially polymerized urea-formaldehyde resin having a urea to formaldehyde molar ratio of between about 1.2:1 and about 2:1, water insoluble compounds of at least two of the minor elements required in plant nutrition selected from the group consisting of copper, manganese, zinc, iron, titanium, boron, strontium, lead, molybdenum, nickel, vanadium, cobalt, and chromium, an organic chelating agent capable of forming metal complexes with said minor element compounds at a pH between about 3 and about 9, superphosphate containing monocalcium phosphate, dicalcium phosphate, and tricalcium phosphate, at least 5% of said superphosphate being tricalcium phosphate, at least two potassium fertilizer compounds one of which is more soluble in water than the other, from 10 to 50% by weight of said potassium compounds being of lower solubility, at least two magnesium fertilizer compounds one of which is more soluble in water than the other, from 10 to about 90% by weight of said magnesium compounds being of lower solubility and sulfuric acid to partially granulate the solids, conveying said partially granulated solids to a rotating granulator, contacting said partially granulated solids with sulfuric acid and a water soluble nitrogen fertilizer compound selected from the group consisting of ammonium fertilizer salts and urea, the total nitrogen content added as said water soluble nitrogen content being less than the nitrogen content provided by said polymerized urea-formaldehyde resin in the range from about 20 to about 45% by weight of the total nitrogen content, whereby solid ammonium sulfate and ammonium phosphate are formed in situ, continuously removing a portion of the granular solids from the rotating granulator, heating said granulated solids to dryness, separating oversized granules having a particle size larger than about 10 mesh and fine particles passing through a screen of about 14 mesh from the granular product, crushing the oversized particles, recycling the crushed oversized particles to said separation step, and recycling fine particles to the solids mixing step, and recovering the fertilizer product in granular form.

2. The process of claim 1 wherein the average temperature of the solids during the drying step is maintained at between about 130° and about 160° F.

3. The process of claim 1 wherein the product has a particle size between about −6 and about +40 mesh.

4. The process of claim 1 wherein at least 90% of the particles of said minor element compounds pass through a 325 mesh screen.

5. A continuous process for the preparation of a complete granular fertilizer having controlled release properties for each of its N, P, K and Mg fertilizer ingredients which comprises the steps of mixing solid condensed partially polymerized urea-formaldehyde resin fertilizer having a urea to formaldehyde molar ratio of between about 1.2:1 and about 2:1, finely divided water insoluble compounds of at least two of the minor elements required in plant nutrition selected from the group consisting of copper, manganese, zinc, iron, titanium, boron, strontium, lead, molybdenum, nickel, vanadium, cobalt, and chromium, an organic chelating agent capable of forming metal complexes with said minor element compounds at a pH between about 3 and about 9, superphosphate containing monocalcium phosphate, dicalcium phosphate and tricalcium phosphate, at least 5% of said superphosphate being tricalcium phosphate, a double sulfate of potassium and magnesium, a potassium compound selected from the group consisting of potassium chloride, potassium sulfate and mixtures thereof from 10 to 50% by weight of said total potassium content being as the double sulfate of potassium and magnesium, dolomite in quantity to provide between about 10 to about 90% by weight of the total magnesium compound present, and sulfuric acid to partially granulate the solids, conveying said partially granulated solids to a rotating granulator, contacting said partially granulated solids with sulfuric acid and a water soluble nitrogen fertilizer compound selected from the group consisting of ammonium fertilizer salts and urea, the total nitrogen content added as said water soluble nitrogen content being less than the nitrogen content provided by said polymerized urea-formaldehyde resin and in the range of from 20 to 45% by weight of the total nitrogen content, whereby solid ammonium sulfate and ammonium phosphate are formed in situ, continuously removing a portion of the granular solids from the rotating granulator, heating said granulated solids to dryness, separating the oversized granules having a particle size larger than about 10 mesh and fine particles passing through a screen of about 14 mesh from the granular product, crushing the oversized particles, recycling the crushed oversized particles to said separation step, and recycling fine particles to the solids mixing step, and recovering the fertilizer product in granular form.

6. A continuous process for the preparation of a complete granular fertilizer having controlled release properties for each of its N, P, K and Mg fertilizer ingredients and having a N-$P_2O_5$-$K_2O$ content of about 14–7–7, percentage on a weight basis, which comprises the steps of mixing about 460 parts of a fully condensed, partially polymerized urea-formaldehyde resin fertilizer having a urea to formaldehyde molar ratio between about 1.2:1 and about 2:1, about 100 parts of a mixture of water insoluble compounds of minor elements required in plant nutrition selected from the group consisting of copper, manganese, zinc, iron, titanium, boron, strontium, lead, molybdenum, nickel, vanadium, cobalt, and chromium and an organic chelating agent capable of forming metal complexes with said minor element compounds at a pH between about 3 and about 9, about 720 parts of superphosphate, about 116 parts of potassium chloride, about 326 parts of langbeinite, about 20 parts of dolomite, and about 46.5 parts of sulfuric acid as an aqueous solution, continuously adding the mixture to a rotating granulator, reacting the mixture with about 247 parts of an aqueous solution of ammonia, ammonium nitrate and urea containing about 28% free ammonia, about 40% ammonium nitrate, about 15% urea, and about 17% water by weight, whereby solid ammonium sulfate and ammonium phosphate are formed in situ, continuously removing portions of the granular solids from the rotating granulator, heating said portion of solids to dryness, separating the oversize granules having a particle size larger than between about 6 and about 10 mesh and fine particles passing through a screen of between about 14 and about 40 mesh from the granular product, crushing the oversize particles, recycling the crushed oversize and fine particles to said solids mixing step, and recovering the fertilizer product in granular form.

7. The process of claim 6 wherein the granular fertilizer product has a particle size between about −6 and about +40 mesh.

8. A complete granular fertilizer composition having controlled release properties for each of its N, P, K and Mg fertilizer ingredients containing as essential ingredients:
(a) at least two inorganic phosphate fertilizer compounds, one of which has a higher rate of solubility in water than the other, at least 5% by weight of the total phosphate content being of lower solubility;
(b) at least two potassium fertilizer compounds, one of which has a higher rate of solubility in water than the other, from 10 to 50% by weight of the total potassium content being of lower solubility;
(c) at least two magnesium fertilizer compounds, one of which has a higher rate of solubility in water than the other, from 10 to about 90% by weight of the total magnesium content being of lower solubility;
(d) a condensed, partially polymerized urea formaldehyde resin fertilizer having a urea to formaldehyde molar ratio between about 1.2:1 and 2:1 and a water-soluble nitrogen fertilizer compound selected from the group consisting of ammonium fertilizer salts and urea, 55 to 80% by weight of said material being urea formaldehyde resin fertilizer;
(e) finely divided water-insoluble compounds of at least two minor elements selected from the group consisting of copper, manganese, zinc, iron, titanium, boron, strontium, lead, molybdenum, nickel, vanadium, cobalt, and chromium;
(f) from about 0.5 to about 4.0 weight percent of an organic chelating agent capable of forming metal complexes at a pH between about 3 and about 9 with said minor element compounds;
(e) and (f) combined constituting between about 1.5 and about 5.5% by weight of said complete granular fertilizer composition.

9. A complete granular fertilizer composition having controlled release properties for each of its N, P, K and Mg fertilizer ingredients containing as essential ingredients:
(a) a superphosphate containing monocalcium phosphate, dicalcium phosphate and tricalcium phosphate, at least 5% of said superphosphate being tricalcium phosphate;
(b) a double sulfate of potassium and magnesium and a potassium compound selected from the group consisting of potassium chloride, potassium sulfate and mixtures thereof, from about 10 to about 50% of the total potassium content being as the double sulfate of potassium and magnesium;
(c) dolomite in an amount to provide from about 10 to about 90% by weight of the total magnesium content;
(d) a condensed, partially polymerized urea formaldehyde resin fertilizer having a urea to formaldehyde molar ratio between about 1.2:1 and 2:1 and a water soluble nitrogen fertilizer compound selected from the group consisting of ammonium fertilizer salts and urea, 55 to 80% by weight of the total nitrogen content being urea formaldehyde resin fertilizer;
(e) finely divided water insoluble compounds of at least two minor elements selected from the group consisting of copper, manganese, zinc, iron, titanium, boron, strontium, lead, molybdenum, nickel, vanadium, cobalt, and chromium;
(f) from about 0.5 to about 4.0 weight percent of an organic chelating agent capable of forming metal complexes at a pH between about 3 and about 9 with said minor element compounds;
(e) and (f) combined constituting between about 1.5 and about 5.5% by weight of said complete granular fertilizer composition.

10. A complete granular fertilizer composition having controlled release properties for each of its N, P, K and Mg fertilizer ingredients containing as essential ingredients:
(a) a superphosphate containing monocalcium phosphate, dicalcium phosphate and tricalcium phosphate, at least 5% of said superphosphate being tricalcium phosphate;
(b) double sulfate of potassium and magnesium and potassium chloride, from 10 to 50 weight percent of said two compounds being double sulfate of potassium and magnesium;
(c) dolomite in an amount to provide from about 10 to about 90% by weight of the total magnesium content;
(d) a condensed, partially polymerized urea formaldehyde resin fertilizer having a urea to formaldehyde molar ratio between about 1.2:1 and 2:1, urea, ammonium sulfate, ammonium phosphate and ammonium nitrate, 55 to 80% by weight of the total nitrogen content being urea formaldehyde resin fertilizer;
(e) finely divided water insoluble compounds of at least two minor elements selected from the group consisting of copper, manganese, zinc, iron, titanium, boron, strontium, lead, molybdenum, nickel, vanadium, cobalt, and chromium;
(f) a chelating agent capable of forming metal complexes at a pH between about 3 and about 9 with said minor element compounds selected from the group consisting of ethylenediaminetetracetic acid, sodium salts of ethylenediaminetetracetic acid, N-hydroxyethylethylenediaminetriacetic acid, trimethylenediaminetetracetic acid, diethylenetriaminepentaacetic acid, and mixtures thereof;

(e) and (f) combined constituting between about 1.5 and about 5.5% by weight of said complete granular fertilizer composition.

11. The complete granular fertilizer of claim 8 wherein between about 55% and about 80% of the nitrogen in the fertilizer is present as urea-formaldehyde resin, between about 5% and about 15% of the nitrogen is present as urea, between about 5% and about 15% of the nitrogen is present as ammonium sulfate, between about 5% and about 15% of the nitrogen is present as ammonium nitrate and between about 5% and about 15% of the nitrogen is present as ammonium phosphate.

12. The complete granular fertilizer of claim 8 wherein the chelating agent is diethylenetriaminepentaacetic acid.

13. The complete fertilizer of claim 9 wherein said finely divided water insoluble compounds of at least two minor elements are at least 90% of −325 mesh size.

References Cited in the file of this patent

UNITED STATES PATENTS

| | | |
|---|---|---|
| 2,448,126 | Shoeld | Aug. 31, 1948 |
| 2,618,546 | Davenport | Nov. 18, 1952 |
| 2,592,809 | Kralovec et al. | Apr. 15, 1952 |
| 2,732,290 | Vana et al. | Jan. 24, 1956 |
| 2,827,368 | Moctenson et al. | Mar. 18, 1958 |
| 2,828,182 | Cheronis et al. | Mar. 25, 1958 |
| 2,833,640 | Bersworth | May 6, 1958 |
| 2,859,104 | Kroll | Nov. 4, 1958 |
| 2,882,141 | O'Donnell | Apr. 14, 1959 |
| 2,931,716 | Kealy et al. | Apr. 5, 1960 |
| 2,955,930 | Kealy | Oct. 11, 1960 |
| 2,958,594 | Halpern et al. | Nov. 1, 1960 |